United States Patent [19]

Murata et al.

[11] Patent Number: 4,860,090
[45] Date of Patent: Aug. 22, 1989

[54] DIGITAL SIGNAL PROCESSING CIRCUIT DRIVEN BY A SWITCHED CLOCK AND USED IN TELEVISION RECEIVER FOR PROCESSING STANDARD AND NONSTANDARD TELEVISION SIGNALS

[75] Inventors: Toshinori Murata; Ikuya Arai; Toshiyuki Kurita; Isao Nakagawa, all of Yokohama, Japan

[73] Assignee: Hitachi, Ltd., Tokyo, Japan

[21] Appl. No.: 164,914

[22] Filed: Mar. 7, 1988

[30] Foreign Application Priority Data

Mar. 9, 1987 [JP] Japan .................................. 62-51909

[51] Int. Cl.$^4$ ............................................. H04N 9/64
[52] U.S. Cl. ................................... 358/21 R; 358/13; 358/19; 358/31; 358/148; 358/11
[58] Field of Search .................... 358/13, 17, 19, 21 R, 358/23, 148, 31, 11

[56] References Cited

U.S. PATENT DOCUMENTS

| | | | |
|---|---|---|---|
| 3,904,823 | 9/1975 | Van Straaten | 358/148 |
| 4,063,288 | 12/1977 | Eckenbrecht et al. | 358/148 |
| 4,096,528 | 6/1978 | Tuma et al. | 358/148 |
| 4,228,461 | 10/1980 | Weissmueller | 358/148 |
| 4,400,719 | 8/1983 | Powers | 358/21 R |
| 4,504,862 | 3/1985 | Achstaetter | 358/17 |
| 4,509,072 | 4/1985 | Elmis et al. | 358/17 |
| 4,665,437 | 5/1987 | Nicholson | 358/148 |
| 4,739,390 | 4/1988 | Achiha et al. | 358/31 |
| 4,791,488 | 12/1988 | Fukazawa et al. | 358/148 |

FOREIGN PATENT DOCUMENTS

| | | | |
|---|---|---|---|
| 2723949 | 11/1978 | Fed. Rep. of Germany . | |
| 79379 | 5/1983 | Japan . | |
| 115995 | 7/1983 | Japan . | |
| 164392 | 9/1983 | Japan | 358/23 |
| 45770 | 3/1984 | Japan . | |
| 87491 | 5/1986 | Japan . | |

*Primary Examiner*—John W. Shepperd
*Attorney, Agent, or Firm*—Antonelli, Terry & Wands

[57] ABSTRACT

A digital television receiver includes a decision circuit for deciding whether an input television signal is a standard signal or a nonstandard signal. A first clock signal generator circuit for generating a first sampling clock signal synchronized with a color burst signal is provided in combination with a second clock signal generator circuit for generating a second sampling clock signal synchronized with a horizontal synchronizing signal. When the standard television signal is received, the television signal is processed by employing the first sampling clock signal. When the nonstandard television signal is received, the television signal is processed by employing the second sampling clock signal.

16 Claims, 7 Drawing Sheets

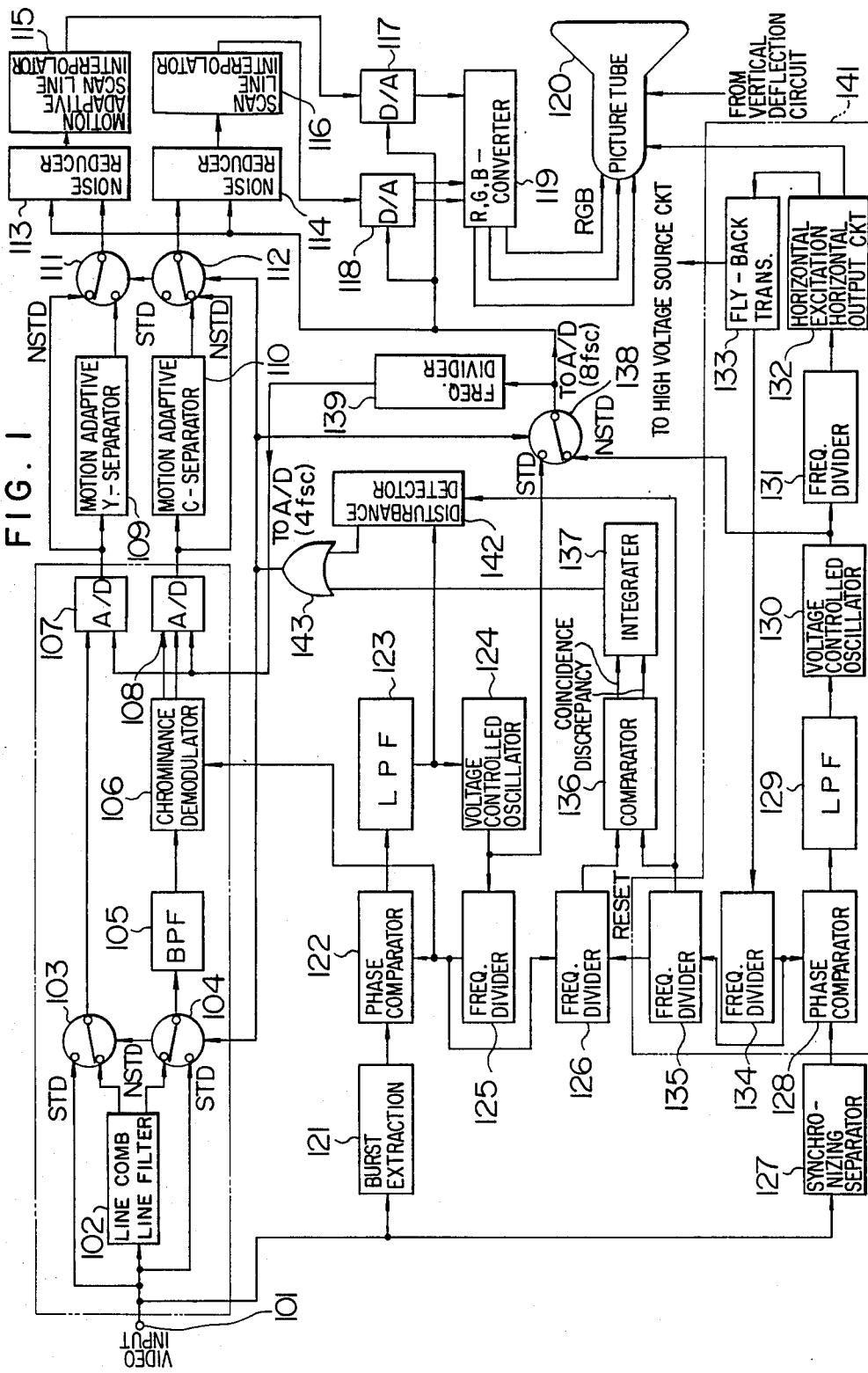

DIGITAL SIGNAL PROCESSING CIRCUIT DRIVEN BY A SWITCHED CLOCK AND USED IN TELEVISION RECEIVER FOR PROCESSING STANDARD AND NONSTANDARD TELEVISION SIGNALS

BACKGROUND OF THE INVENTION

The present invention relates in general to a digital television receiver in which a television signal is converted into a digital signal before being processed. More particularly, the present invention is concerned with a signal processing circuit for the digital television receiver capable of performing signal processing correctly even on a nonstandard television signal which is reproduced by a video tape recorder, optical disk player or the like and which does not conform to the specification of the standard television signal.

In conventional television receivers, it is known that disturbance such as cross-color, dot-crawl and similar phenomena take place due to the frequency-multiplexing of chrominance signal on the luminance signal. Additionally, deterioration in picture quality such as line flicker, scanning line interference or the like is brought about due to the interlaced scanning. With a view to eliminating the factors involved in the deterioration in the picture quality such as mentioned above thereby ensuring a high quality in the reproduced picture, there has been proposed an apparatus in which a digital signal processing technique is utilized in combination with the use of a semiconductor memory. This apparatus usually includes a frame comb filter for separating the luminance signal and the chrominance signal from each other by making use of an inter-picture temporal correlation (frame correlation or field correlation) and a signal processing circuit for generating scanning signals sequentially by doubling the number of scanning lines through interpolation thereof with the picture or video signal belonging to different scanning lines. These circuits are disclosed in Japanese Patent application Laid-Open Nos. 115995/1983 and 79379/1983 (JP-A-No. 58-115995 and JP-A-No. 58-79379). However, the signal processing technique implemented in these circuits is only effective in the processing for generating the still picture in which a plurality of frame signals and a plurality of field signals exhibit strong cross-correlations, respectively. In case of the signal processing for motion picture, the signal processing technique undesirably gives rise to occurrence of interference signals. To deal with this problem, there is known a circuit designed to produce a signal representative of the difference in the picture (video) signal between two adjacent frames for the purpose of detecting the motion (change) of the picture. When a picture or video signal is determined for the still picture by the above-mentioned detecting circuit, then the signal processing is performed along the time axis by using the frame comb filter and the inter-field interpolation circuit. On the other hand, when the picture (video) signal is determined for the motion picture, an intra-field spatial processing is performed on the field signal. The so-called motion-adaptive processing circuit is known from Japanese Patent Application Laid-Open No. 45770/1984 (JP-A-No. 59-45770).

The technique mentioned above is certainly effective for processing a television signal whose chrominance subcarrier frequency $f_{SC}$, horizontal scanning frequency $f_H$ and vertical scanning frequency $f_V$ are exactly at respective predetermined values (this television signal is hereinafter be referred to as the standard television signal or simply as the standard signal). However, difficulty is encountered in processing effectively the television signal whose chrominance subcarrier frequency $f_{SC}$, horizontal scanning frequency $f_H$ and vertical scanning frequency $f_V$ are not at the predetermined values as in the case of the television signal produced by the video tape recorder (VTR) for domestic or home use, personal computer or the like (this signal is hereinafter referred to as the nonstandard television signal or simply as the nonstandard signal).

The chrominance subcarrier frequency $f_{SC}$ is so determined as to bear such relationship to the horizontal scanning frequency $f_H$ which is given by:

$$f_{SC} = \frac{455}{2} f_H \quad (1)$$

On the other hand, the horizontal scanning frequency $f_H$ bears a relationship to the vertical scanning frequency $f_V$ which is given by:

$$f_H = \frac{525}{2} f_V = (262 + \tfrac{1}{2}) f_V \quad (2)$$

The expression (2) indicates that the scanning lines are interlaced such that there is interposed just at a mid point between two pixels (picture elements) on two adjacent scanning lines in the current field signal a pixel on the scanning line of the preceding field. On the other hand, the following expression can be derived from the abovementioned expressions (1) and (2).

$$f_{SC} = (119437 + \tfrac{1}{2}) \frac{f_V}{2} \quad (3)$$

This expression (3) shows that the chrominance subcarrier is inverted in phase at every interval equal to one frame period. As will be seen, the relations mentioned above hold true for the standard television signal, which thus can undergo the signal processing by using the frame comb filter and the inter-field signal interpolation.

However, in the case of the nonstandard signal having the frequencies $f_{SH}$, $f_H$ and $f_V$ which do not satisfy the conditions given by the expressions (1) and (2), the correct pixel positioning between the two fields and the inter-frame phase inversion of the chrominance subcarrier can not take place correctly. As a consequence, scanning line interpolation by using the signal of two fields as well as separation of the luminance and chrominance signals by means of the comb filter cannot be performed accurately. Thus, when the nonstandard picture signal is decided to be a still picture signal, remarkable deterioration will be involved in the picture quality. In this manner, with the prior art circuit, difficulty is encountered in processing the nonstandard signal correctly and appropriately.

On the other hand, in order that the scanning operation in the picture tube be performed with the signal having undergone the scanning line interpolation, a signal having the horizontal scanning frequency of $f_H$ contained in the input television signal must be extracted to serve as a standard signal for generating a signal having a doubled frequency $2f_H$ for establishing synchronization in the deflection circuit of the picture tube. Ordinarily, the signal of frequency $2f_H$ is generated by a phase-locked loop (PLL) circuit operating in synchronism with the synchronizing signal separated from the input television signal and employed as the reference signal for the signal processing. The deflection circuit is controlled by an automatic frequency control (AFC) circuit to which the signal of the frequency $2f_H$ is supplied. Usually, this AFC circuit also includes a PLL circuit. Accordingly, the deflection circuit is caused to synchronize with the synchronizing signal of the frequency $f_H$ at the frequency of $2f_H$ by way of the first and second cascaded PLL circuits. The nonstandard signal generated by a VTR for home use contains appreciably jitter and skew components. Consequently, the regenerated synchronizing signal is poor in the stability. When the input signal contains the skew component (step-like change in the phase of the synchronizing signal), the first PLL circuit makes a vibratory response in an effort to follow up such change in the input signal. The second PLL circuit in turn makes a more intensive vibratory response in order to follow up the output signal of the first PLL circuit. In this way, a lot of delay is involved until the deflection circuit has attained the state to follow the change in the phase of the input signal perfectly. Further, when the synchronizing signal contains jitter components appearing irregularly, each of the PLL circuits operates with a vibratory response to the synchronizing signal containing the jitter, as a result of which the latter appears in the picture displayed on the faceplate of the picture tube in the form of flutter. As will now be understood, the prior art digital television receiver suffers a problem that the deflection circuit is poor in stability when processing the nonstandard signal produced by the home VTR for home use or the like system.

SUMMARY OF THE INVENTION

An object of the present invention is to provide a signal processing circuit and a synchronizing signal processing circuit which can ensure picture regeneration with high quality even for the nonstandard television signal.

In view of the above object, there is provided according to an aspect of the present invention a signal processing circuit which comprises first pulse generating means for separating a synchronizing signal from an input television signal and generating a first pulse signal in synchronism with the separated synchronizing signal, second pulse generating means for generating a second pulse signal in synchronism with a color burst signal contained in the input television signal, first and second frequency dividers for dividing frequencies of the first and second pulse signals by predetermined divisors, respectively, and comparison means for comparing the output signals of the first and second frequency dividers with each other to detect whether the input television signal is a standard signal or a nonstandard signal, wherein the proper processing for the input television signal is performed on the basis of the result of the detection.

With a view to assuring more positive detecting operating mentioned above, the signal processing circuit according to an embodiment of the invention may include disturbance detecting means for detecting disturbance in a control voltage for regeneration of the color burst in a chrominance modulation circuit, so that a correct decision can be made as to whether the input television signal is the standard or the nonstandard signal even when the input signal is the nonstandard signal which is very close to the standard, as in the case of a picture signal generated by an optical disk player in the still regeneration mode.

The synchronizing signal processing circuit according to an aspect of the present invention includes a single PLL (phase-locked loop) circuit. More specifically, an output signal of a synchronizing separator circuit is directly compared with a signal derived from frequency division of a fly-back signal by means of a phase comparator whose output signal is utilized for controlling a voltage controlled oscillator. The output signal of the voltage controlled oscillator is divided in frequency by a divisor of a predetermined value to thereby generate a deflecting signal having a frequency which is twice as high as the horizontal frequency. The output signal of the voltage controlled oscillator is also used as a clock signal for processing the nonstandard signal.

The first frequency divider divides the frequency $f_H$ synchronized with the synchronizing signal by a divisor m (where m=1,2, . . . ), while the second frequency divider divides the frequency of the signal synchronized with the color burst signal $f_{SC}$ by a divisor of 455 m/2. The comparison means compares the output signals of both the frequency dividers with each other. When the input television signal is the standard signal, the relation or condition given by th expression (1) is satisfied, whereby the comparison means can decide that the input signal is the standard one. On the other hand, when the television signal is the nonstandard one, the expression (1) is no longer met. Thus, the comparison means can decide that the input signal is nonstandard.

In the still reproduction mode of the optical disk player, the chrominance subcarrier of the composite picture signal outputted from the optical disk player assumes the same phase in every frame. The composite picture signal thus belongs to the nonstandard signal. In this case, it is noted that the chrominance subcarrier becomes discontinuous once for one frame period. This discontinuity presents a cause for disturbance in the control voltage supplied to the voltage controlled oscillator of the chrominance synchronizing circuit. Thus, the disturbance detecting means mentioned above can be arranged such that the composite picture signal is decided to be the nonstandard signal when the control voltage exceeds a predetermined threshold value.

On the basis of the results of the detection described above, the signal processing circuit performs signal processing for the standard signal by using the clock signal synchronized with the color burst signal while for the nonstandard signal, the output signal of the voltage controlled oscillator which is in synchronism with the horizontal synchronizing signal is utilized as the clock signal. A motion-adaptive spatial luminance/chrominance separation circuit may be provided for performing intra-field processing on the nonstandard signal.

In an embodiment of the invention, a PLL circuit is constituted by the voltage controlled oscillator operating synchronously with the horizontal synchronizing signal, the frequency divider and the phase comparator, wherein the PLL circuit produces a horizontal excitation output signal by directly referring to the horizontal synchronizing signal, which output signal has a frequency twice as high as that of the horizontal synchronizing signal and is utilized for driving the deflecting circuit. With the inventive arrangements described above, optimal processing can be performed even for the nonstandard signal. There can thus be provided a television receiver capable of presenting pictures of improved quality.

BRIEF DESCRIPTION OF THE DRAWINGS

FIG. 1 is a view showing in a block diagram a general arrangement of a signal processing circuit for a television receiver according to a first exemplary embodiment of the present invention;

DESCRIPTION OF THE PREFERRED EMBODIMENTS

Figure 2A:
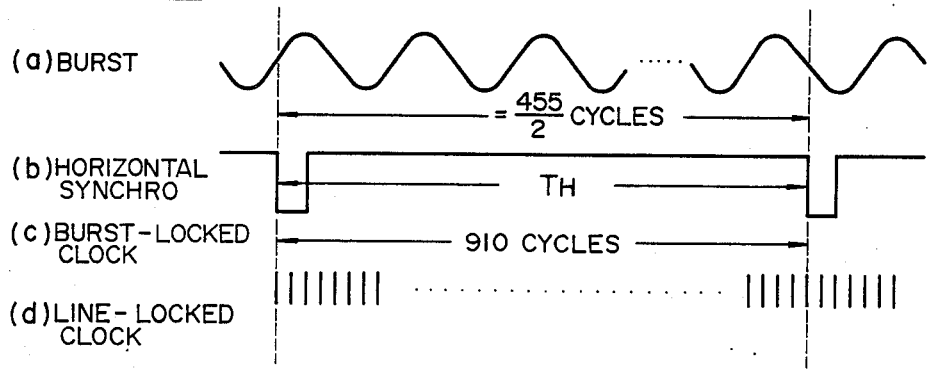
FIGS. 2a and 2b are views showing waveforms of a standard signal and a nonstandard signal, respectively.

Now, the present invention will be described in detail in conjunction with exemplary embodiments thereof.

FIG. 1 shows a general arrangement of a picture signal processing circuit and a synchronizing signal processing circuit in a digital television receiver according to a first embodiment of the invention.

At the outset, description will be directed to operation of the picture or video signal processing circuit by referring to FIG. 1. Upon application of a standard television signal to a video signal input terminal 101, switches 103, 104, 111, 112 and 138 are closed to the respective positions (labelled STD) opposite to those (labelled NSTD) illustrated in the figure. The input signal is applied directly to an analogue-to-digital (A/D) converter 107 allocated for a luminance signal. Additionally, the input signal is also supplied to a band pass filter (BPF) 105 through which only the signal component of chrominance signal band is extracted to be subsequently supplied to a chrominance demodulator circuit 106, whereby two color difference signals are obtained. The color difference signals are then supplied to an A/D converter 108 to be thereby converted to digital signals.

The output signal of the A/D converter 107 is supplied to a motion-adaptive temporal-spatial luminance (Y) separator 109 which produces a luminance signal freed from cross-talk of the chrominance signal. The luminance signal outputted from the motion adaptive luminance separator circuit 109 is supplied to a noise reducer circuit 113 through which noise component contained in the luminance signal is reduced. The output signal of the noise reducer 113 is supplied to a motion-adaptive temporal-spatial scanning line interpolator 115 to undergo interpolation of the scanning lines. The output signal of the scanning line interpolator 115 is supplied to a digital/analogue (D/A) converter 117, whereby a luminance signal having the horizontal period contracted by a factor of ½ is obtained. On the other hand, the output signal of the aforementioned A/D converter 108 is supplied to a motion-adaptive chrominance (C) separator circuit 110 through which a chrominance signal freed from cross-talk of the luminance signal is obtained. The chrominance signal outputted from the chrominance separator 110 is then supplied to a noise reducer 114 where noise contained in the chrominance signal is reduced. The output signal of the noise reducer 114 is supplied to a scanning line interpolator circuit 116 where the chrominance signal undergoes interpolation of the scanning lines, the output signal of this interpolator 116 being then supplied to a D/A converter 118 which produces the chrominance signal having the horizontal period contracted by ½. The progressive scanned luminance and chrominance signals obtained from the D/A converters 117 and 118, respectively, are supplied to a RGB converter circuit 119 to be converted to R (red), G (green) and B (blue) primary signals which are then fed to a picture tube 120.

Next, operation of the signal processing circuit will be described on the assumption that a nonstandard television signal is applied to the input video terminal 101. In this case, the switches 103, 104, 111, 112 and 138 are closed to the respective positions (NSTD) illustrated in FIG. 1. At first, the input video signal is separated into a luminance signal and a chrominance signal by means of a spatial processing line comb-line filter 102. The chrominance signal thus derived is transformed to two color difference signals through the BPF 105 and the chrominance demodulator circuit 106. The luminance signal and the color difference signals are converted to digital signals by the A/D converters 107 and 108, respectively. The output signal of the A/D converters 107 and 108 are supplied to the noise reducers 113 and 114, respectively, without being passed through the luminance (Y) separator circuit 109 and the chrominance (C) separator circuit 110 shown in the figure. After having noise reduced by the noise reducers 113 and 114, the luminance signal and the color difference signal undergo scanning line interpolation through the scanning line interpolators 115 and 116, respectively, to be supplied to the picture tube 120.

Next, description will be directed to a clock signal generating circuit which can be employed in association with the signal processing circuit described above. It must first be mentioned that in the case of the illustrated embodiment, two clock signals, i.e. a first clock signal generated with reference to a color burst signal contained in the input television signal and a second clock signal generated with reference to a horizontal synchronizing signal contained in the input video signal are employed. More specifically, the first clock signal is employed in conjunction with the standard television signal with the second clock signal being employed for the nonstandard signal. For convenience of description, the first clock signal is hereinafter referred to as the burst-locked clock signal, while the second clock signal is referred to as the line-locked clock signal. Referring to FIG. 1, the input video signal (a composite picture signal) is supplied to a burst signal extractor circuit 121 where a color burst signal (having a frequency $f_{SC}$) is extracted. A voltage controlled oscillator 124 generates a signal having a frequency of $8 \times f_{SC}$ which undergoes frequency division by a divisor of ⅛ in a frequency divider 125. The frequency-divided signal is then supplied to a phase comparator 122 to be compared with the color burst signal in respect to the phase, wherein an error signal resulting from the comparison by the phase comparator 122 is supplied to the voltage controlled oscillator 124 through a low-pass filter (LPF) 123. On the other hand, the input video signal is also applied to a synchronizing separator circuit 127 where a horizontal synchronizing signal is separated from the input video signal to be subsequently applied to a phase comparator 128. A voltage controlled oscillator 130 oscillates at a frequency of $8 \times f_{SC}$. The output signal of the voltage controlled oscillator 130 undergoes frequency division by a divisor of 910 (i.e. multiplication with 1/910) in a frequency divider circuit 131 and is supplied to another frequency divider 134 by way of a horizontal excitation/horizontal output circuit 132 and a fly-back transformer 133 to be further divided in frequency by a divisor of 2 (multiplication with ½). Thus, the output frequency of the voltage controlled oscillator 130 has undergone the frequency division by a factor of 1/1820 in total. The output signal of the frequency divider 134 undergoes phase comparison with the output signal of the synchronizing separator circuit 127 in a phase comparator 128, wherein an error voltage signal resulting from the phase comparison is supplied to the voltage controlled oscillator 130 by way of a LPF 129. The output signals of the voltage controlled oscillators 124 and 130 constitute the aforementioned burst-locked clock signal and line-locked clock signal, respectively. These clock signals are applied directly to the D/A converters 117 and 118, respectively, and additionally to the A/D converters 107 and 108 by way of a frequency divider 139.

Figure 2B:
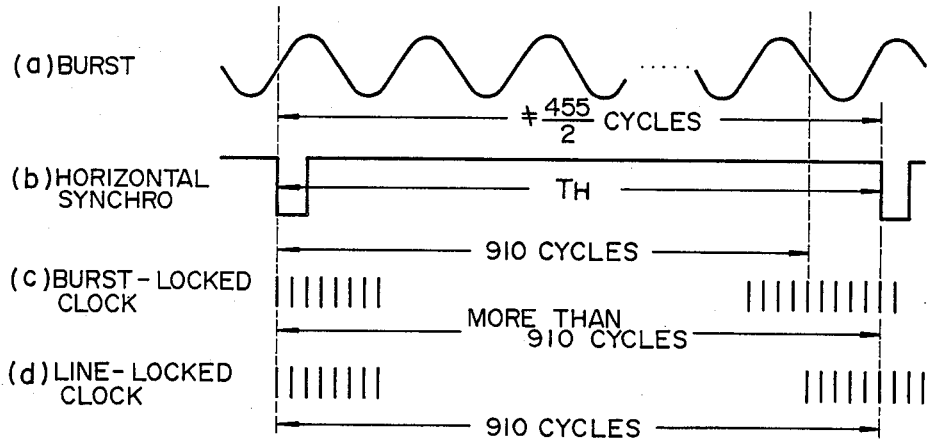

Now, the reason why the signal processing channels and the clock signals are changed over for the standard signal and the nonstandard signal will be described. FIGS. 2a and 2b show waveforms of the color burst signal at (a), the horizontal synchronizing signal at (b), the burst-locked clock signal at (c), and the line-locked clock signal at (d) for the standard video signal and the nonstandard video signal, respectively.

When the standard signal is applied to the input terminal 101, 910 cycles of the burst-locked clock signal and the line-locked clock signal each having the frequency of $4f_{SC}$ make appearance, respectively, within one horizontal synchronizing period $T_H$ [see FIG. 2a, (c) and (d)], since 455/2 cycles of the color burst signal having the frequency of $f_{SC}$ are present within one horizontal synchronizing period [see FIG. 2a, (a)]. The comb filter has a function to perform arithmetic operation on two signals spaced from each other by one-frame period or by one-line period for separating the luminance signal and the chrominance signal from each other. In the instant case, the phase of the color burst signal is inverted at an interval corresponding to a period of 910 clocks, while the luminance signal remains in same phase regardless of whether the burst-locked clock or the line-locked clock is employed. Thus, there can be derived the luminance signal from a signal representative of a sum of two composite video signals spaced from each other by the abovementioned period while the chrominance signal can be derived from a signal representative of difference between the two composite video signals.

Interpolation of the scanning line may be performed, for example, by inserting the video signal corresponding to n-th scanning line in one field between that n-th scanning line and the (n+1)-th scanning line or alternatively by inserting the signal of n-th scanning line in an immediately preceding field between the n-th scanning line and the (n+1)-th scanning line in the succeeding field. In this case, the scanning line interpolation can be realized correctly independent of whether any of the clock signals mentioned above is employed.

In the noise reducer, either of the burst-locked clock or the line-locked clock can be equally employed.

Next, it is assumed that the nonstandard signal is supplied to the video input terminal 101. In the case of the nonstandard signal, the number of cycles of the color burst signal within one horizontal synchronizing period $T_H$ differs from 455/2 cycles [see FIG. 2b, (a)]. Assuming now that more than 455/2 cycles of the burst signal are present within one horizontal synchronizing period, the number of cycles of the burst-locked clock signal within one horizontal synchronizing period $T_H$ is greater than 910 cycles [see FIG. 2b, (c)], while that of the line-locked clock signal is just equal to 910 cycles [FIG. 2b, (d)]. However, the phase of the color burst signal is inverted at every interval of 910 cycles of the burst-locked clock signal. Accordingly, in case the high frequency component in the luminance signal is small (or less), the chrominance signal can be separated from the signal representative of difference between two composite video signals which are spaced from each other by the predetermined period or interval mentioned above. On the other hand, the luminance signal can be obtained from a signal representative of difference between the separated chrominance signal and the input composite video signal.

On the other hand, interpolation of the scanning lines is performed in the manner mentioned below in case the nonstandard signal is processed. Since the scanning is performed with reference to the horizontal synchronizing signal, the clock signal used for the scanning line interpolation should preferably be generated with reference to the horizontal synchronizing signal. Accordingly, the line-locked clock signal is used for the interpolation of scanning line. In this case, the number of cycles of the color burst signal within one horizontal synchronizing period is greater than 455/2 cycles. Consequently, deviation of some degree will take place between the luminance signal and the chrominance signal toward the end of the horizontal scanning.

Further, the line-locked clock signal is suited for the noise reducer, because the line-locked clock signal is also in synchronism with the vertical synchronizing signal within the field or frame period.

As will now be appreciated from the foregoing description, the clock signal to be used for the standard video signal may be either the burst-locked clock signal or the line-locked clock signal. On the other hand, in the case of the nonstandard video signal, the burst-locked clock signal is suited for use in the comb filter, while the line-locked clock signal is preferred for the scanning line interpolation. However, in consideration of the fact that the burst-locked clock signal is generated in most cases by a crystal oscillator with the line-locked clock signal being generated by an oscillator composed of a LC-filter, it can be said that the burst-locked clock signal is superior over the line-locked clock signal in respect to the stability. Accordingly, it is preferred to employ the burst-locked clock for the standard television signal.

Next, description will be made on a circuit arrangement for detecting the standard television signal and the nonstandard television signal. In a first circuitry of this detection circuit, both the burst-locked clock signal and the line-locked clock signal are used. As a signal associated with the burst-locked clock signal, the output signal of the frequency divider 125 is used, as shown in FIG. 1. This output signal is supplied to a frequency divider 126 to undergo frequency division by a divisor, for example, of $(455\times525)/4$. The signal output from the frequency divider 126 is a pulse signal having the same frequency as the vertical frequency, as will be seen from the expressions (1) and (2) mentioned hereinbefore. This pulse signal may also be derived by dividing the clock signal having a frequency of $4f_{SC}$ by a divisor of $455\times525$.

Figure 3:
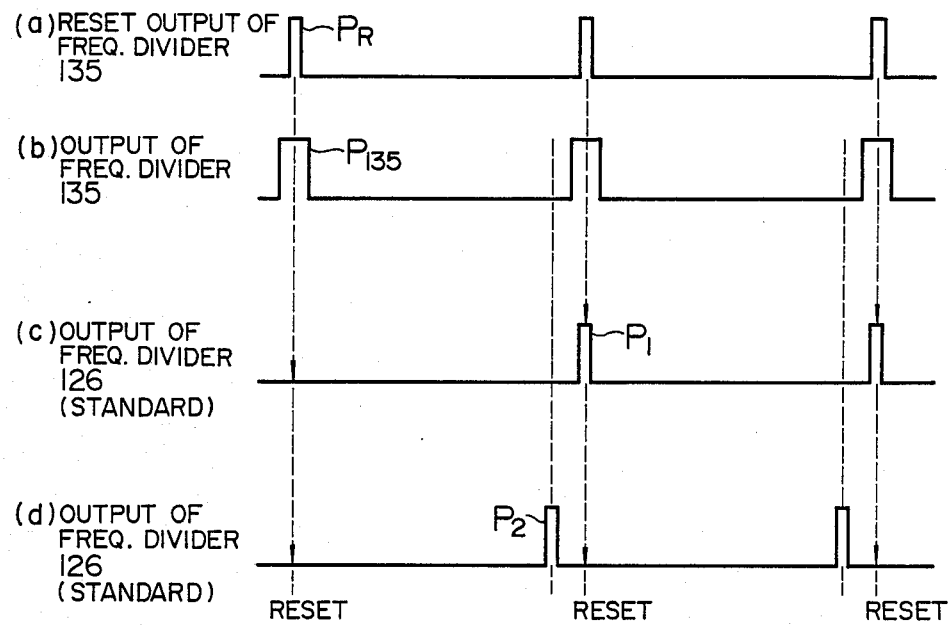
FIG. 3 is a waveform diagram for illustrating operation of a standard/nonstandard signal detecting circuit.

On the other hand, the output signal of the frequency divider 134 is used as the signal associated with the line-locked clock signal. The output signal of the frequency divider 134 has a frequency of $f_H$. Accordingly, by dividing the frequency of this output signal, for example, by 525/2 by means of a frequency divider 135, there can be obtained a pulse signal having the same frequency as the vertical frequency. By arranging the frequency dividers 135 and 126 in conjunction with the two pulse signals mentioned above such that the frequency divider 126 is reset by the output signal of the frequency divider 135, as shown in FIG. 1, the output signals of the frequency dividers 126 and 135 will be such as illustrated in FIG. 3. More specifically, referring to FIG. 3, the frequency divider 135 produces a reset signal $P_R$ shown in FIG. 3 at (a) and an output signal $P_{135}$ of a predetermined pulse width having a leading edge rising up in precedence to the reset pulse $P_R$ and a trailing edge falling in succession to the reset pulse $P_R$. The frequency divider 126 is reset by the reset pulse $P_R$ to start the frequency dividing operation. The output signal of the frequency divider 126 is produced at different timing in dependence on whether the input signal applied to the input terminal 101 is the standard television signal or the nonstandard signal, as explained below.

When the input signal to the input terminal 101 is the standard television signal, the conditions given by the expressions (1) and (2) are satisfied. Consequently, the timing at which the output signal $P_1$ of the frequency divider 126 is produced coincides approximately with that of the reset pulse $P_R$ produced by the frequency divider 135, as is shown in FIG. 3 at (b) and (c). Thus, the output signal $P_1$ of the frequency divider 126 is covered by the width of the output pulse $P_{135}$ of the frequency divider 135. The comparator 136 (FIG. 1) may be constituted, for example, by a logical AND circuit for detecting the coincidence between the output signals of the frequency dividers 126 and 135. When coincidence is detected, the input signal is decided to be the standard signal. On the contrary, when the input signal is the nonstandard signal, the conditions given by the expressions (1) and (2) can no longer be met. Consequently, the output signal $P_2$ of the frequency divider 126 is not converted by the width or duration of the output signal $P_{135}$ of the frequency divider 135, as is shown in FIG. 3 at (b) and (d). Thus, the comparator detects the discrepancy between both the output signals and decides that the input signal is the nonstandard signal.

It should be noted that the sensitivity of detection in deciding whether the input signal is the standard signal or the nonstandard signal is determined in dependence on the pulse width of the output signal $P_{135}$ of the frequency divider 135. In other words, as the pulse width of the output signal $P_{135}$ becomes greater, likelihood of detecting the nonstandard signal as the standard one is correspondingly increased. On the other hand, as the pulse width of the output signal $P_{135}$ becomes narrower, likelihood of detecting the standard signal as the nonstandard signal is correspondingly increased.

In the case of the illustrative embodiment of the invention described above, operation of the comparator 136 is triggered every vertical period. However, period for the decision or identification of the input signal as the standard or nonstandard signal is not restricted to the one vertical period but may be selected equal to one scanning period or one frame period or at any given value. The frequency division ratio or divisors of the frequency dividers 126 and 135 may be selected appropriately.

It should be mentioned that admixing of impulse noise with the signal applied to the input terminal 101 will result in erroneous operation of the synchronizing separator circuit 127. As a consequence, the output signal of the frequency divider 134 can not be produced at a correct timing bringing about erroneous operation of the frequency divider 135. Under the circumstance, an integrator circuit 137 is employed for the purpose of preventing erroneous operation due to the impulse noise.

Figure 4:
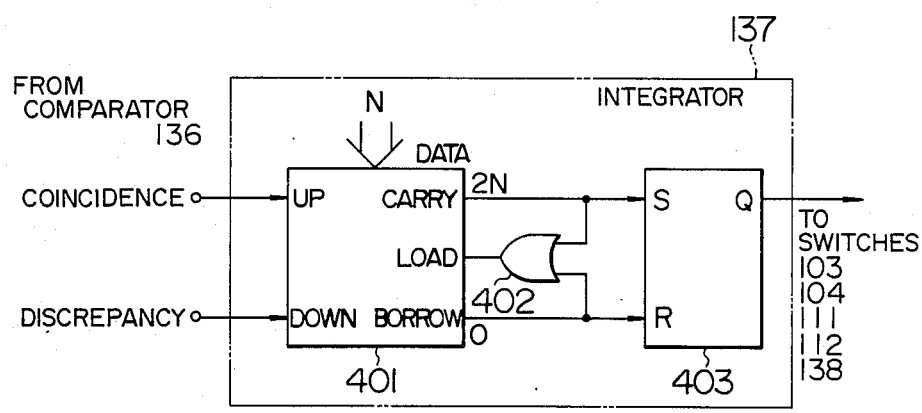
FIG. 4 is a view showing in a block diagram a circuit configuration of the integrator which can be employed in the signal processing circuit according to the invention.

FIG. 4 is a block diagram showing in detail an arrangement of the integrator circuit. Referring to FIG. 4, an up-down counter 401 has an up-count terminal supplied with the coincidence output signal of the comparator 136 and a down-count terminal supplied with the discrepancy output signal thereof. It is assumed that the initial value of the up-down counter 401 is N and that a carry output and a borrow output are produced by the up-down counter 401 for the count value of 2N and 0 (zero), respectively. In response to these pulses, a load pulse for the counter 401 is generated by an OR circuit 402 to set the initial value in the counter 401. Either the coincidence signal or the discrepancy signal is inputted to the up-down counter every vertical period to thereby cause the up-down counter to perform the up-count operation or the down-count operation. Only when the number of input signal exceeds that of the other input signal by N, the up-down counter 401 produces the carry output or the borrow output, whereby a RS flip-flop 403 is set or reset. In this manner, the decision of whether the input video signal is standard or nonstandard can be protected against any appreciable influence notwithstanding erroneous operation of the synchronizing separator circuit 127.

Next, description will be made of a second detector circuit for detecting the nonstandard signal. This second detector circuit serves for detecting disturbance in a control voltage which is utilized in regenerating the color burst for the chrominance demodulation. Referring to FIG. 1, the output signal of the frequency divider 125 has the same frequency of $f_{SC}$ as that of the color burst signal and is also supplied to the chrominance demodulator circuit 106 to be utilized for the chrominance demodulation. It is noted that a composite picture signal regenerated by an optical disk player for domestic use in a specific reproduction mode such as still mode, quick play mode or slow mode is a sort of the nonstandard signal since discontinuity is introduced in the phase of the color burst signal due to the track jump of the optical head. At the discontinuous point in the phase of the burst signal, the phase of the burst signal inputted to the phase comparator 122 changes rapidly. As a consequence, the output signal of the phase comparator 123 is disturbed, which in turn results in that disturbance occurs in the frequency (phase) of the clock signal which is the output signal of the voltage controlled oscillator 124 for a time until the correct phase synchronization is reestablished. Thus, when this clock signal is used for performing the signal processing similar to that performed for the ordinary standard signal, there occurs degradation or deterioration in the picture quality. This phenomenon can be detected by the first detector circuit described hereinbefore, since the condition given by the expression (3) is then no longer satisfied. To this end, however, it is required to enhance the detection sensitivity of the first detection circuit or perform the counting operation over an elongated duration.

According to the teaching implemented in the illustrated embodiment of the present invention, disturbance in the control voltage for the voltage controlled oscillator 124 occurring at the discontinuous point of the color burst signal is made use of. More specifically, a disturbance detecting circuit 142 is provided for detecting the disturbance in the aforementioned control voltage to thereby detect the nonstandard signal. A logical sum of the output signal from the disturbance detecting circuit 142 and the output signal of the integrator circuit 137 is determined by an OR circuit 143, whereby comprehensive decision can be made. In dependence on the output signal of the OR circuit 143, the switches 103, 104, 111, 112 and 138 are correspondingly changed over.

Figure 5:
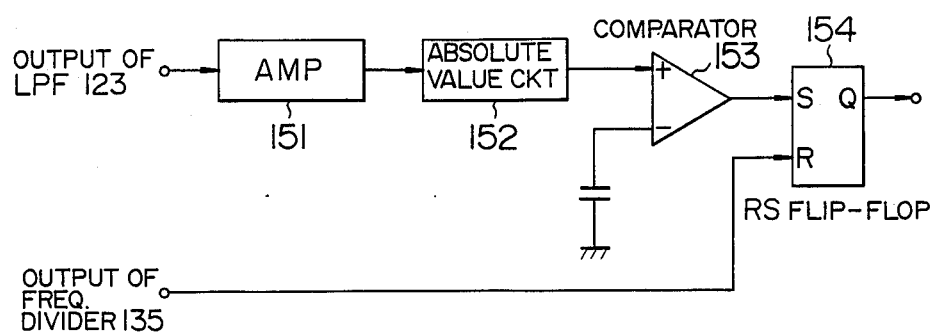
FIG. 5 is a view showing in a block diagram a circuit configuration of the disturbance detecting circuit for detecting disturbance in the control voltage for the voltage controlled oscillator which can be employed in the signal processing circuit according to the invention.
Figure 6:
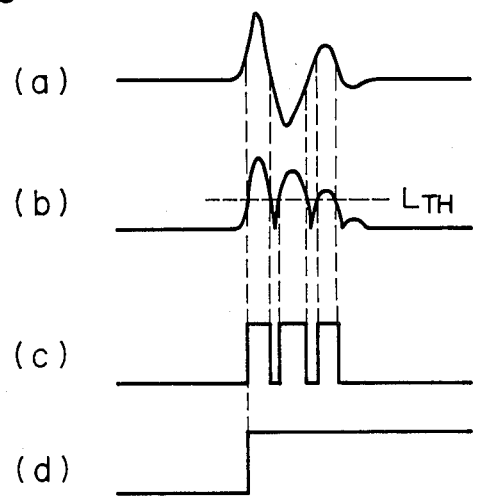
FIG. 6 is a waveform diagram for illustrating operation of the disturbance detecting circuit.

FIG. 5 shows an arrangement of the disturbance detecting circuit 142. Referring to the figure, an amplifier 151 has an input supplied with the output signal of the LPF 123, the output signal having a waveform shown in FIG. 6 at (a). The amplified signal outputted from the amplifier 151 is supplied to an absolute value circuit 152 where the input signal is rectified to a positive polarity signal, which is then supplied to a comparator 153 having a preset threshold value LTH. For the input signal which exceeds the threshold value $L_{TH}$, the comparator 153 produces an output signal of such waveform as illustrated in FIG. 6 at (c) to thereby set a RS flip-flop 154 which responds thereto by producing a signal illustrated in the same figure at (d). With the aid of this signal, the nonstandard signal can be detected. When arrangement is made such that the RS flip-flop 154 is reset by the pulse having one vertical period produced by the frequency divider 135, discriminative determination of the input video signal can be performed at an interval corresponding to the field period.

Next, description is directed to a circuit for regenerating the horizontal synchronizing signal. The output signal of the voltage controlled oscillator 130 oscillating at the frequency of $8f_{SC}$ as described hereinbefore by reference to FIG. 1 undergoes frequency division by a divisor of 910 in the frequency divider 131, whereby a horizontal deflecting pulse having a frequency of $2f_H$ is produced by the frequency divider 131. The output signal of the frequency divider 131 drives a deflection yoke (not shown) and the fly-back transformer 133 by way of the horizontal excitation/horizontal output circuit 132. The deflection yoke serves for the horizontal scanning in the picture tube while the fly-back transformer 133 produces a plurality of voltages utilized in operating the television receiver. The output pulse of the fly-back transformer 133 is divided by a divisor of 2 through the frequency divider 134, which thus produces an output pulse signal having a frequency of $f_H$, which in turn is supplied to a phase comparator 128. In this manner, a signal synchronized with the horizontal synchronizing signal is produced by the PLL circuit on the basis of the output signal of the synchronizing separator circuit 127 employed as the reference signal.

According to the invention, the PLL circuit is made use of for producing the line-locked clock as well as the detection pulse signal for detecting the standard/nonstandard video signal. By virtue of this feature, the circuit can be realized with improved efficiency.

Figure 7:
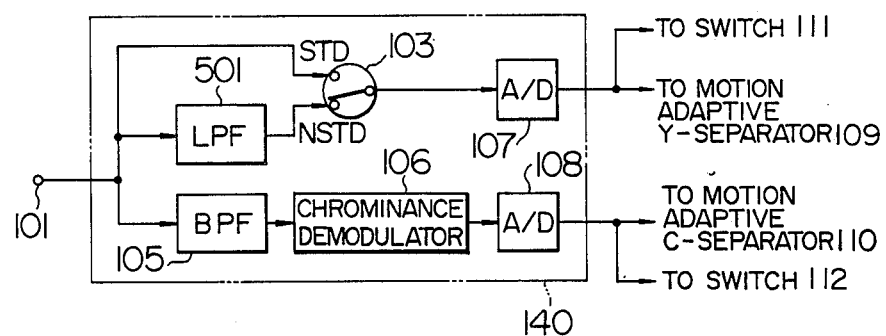
FIG. 7 is a view showing in a block diagram a modification of the luminance/chrominance separation circuit which can be employed in the signal processing circuit according to the invention.

FIG. 7 shows another circuit configuration of the luminance/chrominance signal separating circuit 140. The circuit shown in FIG. 7 is so arranged that the luminance signal is separated by using LPF (low-pass filter) 501 without resorting to the use of the comb line filter. Thus when the input signal is decided to be the nonstandard signal, the luminance signal and the chrominance signal are subjected to separation in frequency. Operation of this circuit 140 for the standard signal inputted to the input terminal 101 is utterly same as that of the circuit shown in FIG. 1. In the case of the nonstandard signal, the signal inputted to the video input terminal 101 is supplied to the LPF 501. In this conjunction it should be mentioned that the most typical one of the picture sources which produce the nonstandard signal is a video tape recorder (VTR) destined for domestic use and that the output signal of the VTR inherently contains high frequency components with lesser luminance component. Thus only the low frequency components of the signal inputted to the input video terminal 101 may be duly regarded as the luminance signal.

Figure 8:
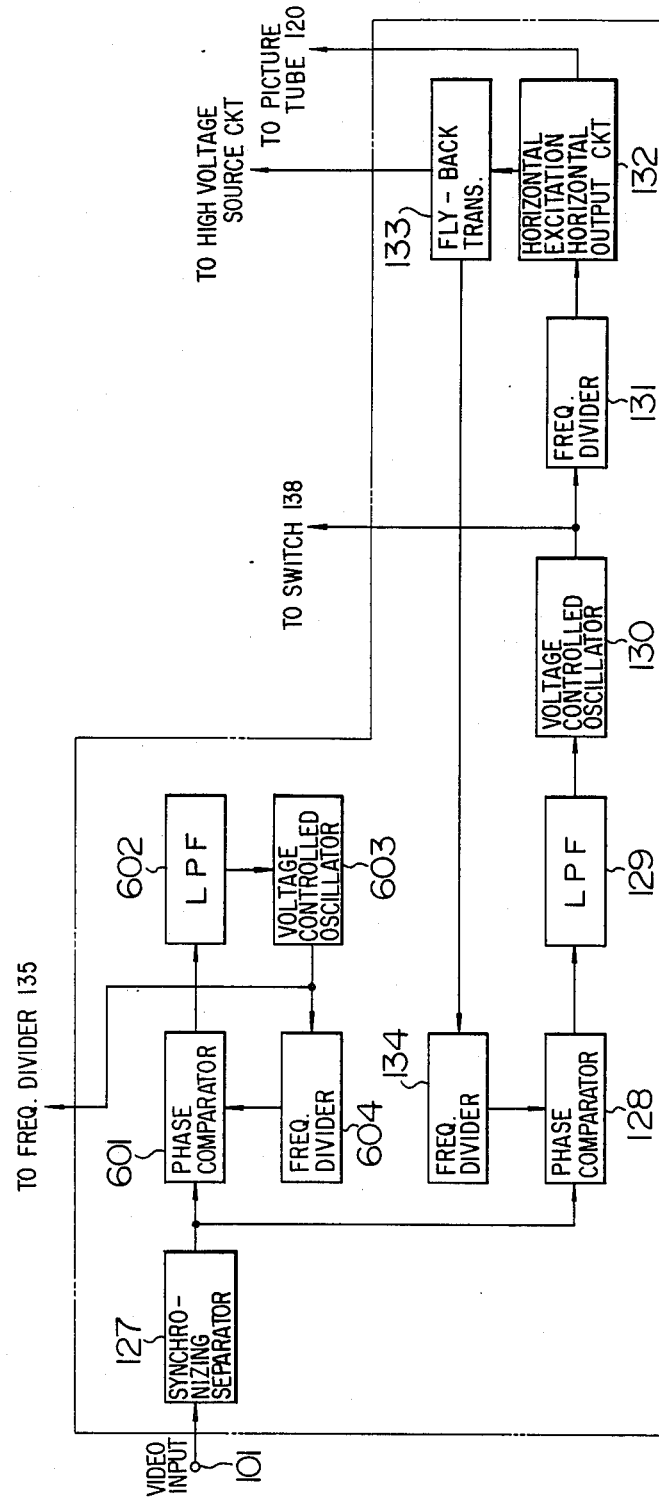
FIG. 8 is a view showing in a block diagram a modification of the synchronizing circuit employed in the signal processor according to the invention.

FIG. 8 shows another circuit configuration of the horizontal synchronizing circuit 141 shown in FIG. 1. In this circuit configuration, the PLL circuit for generating a pulse signal associated with the line-locked clock signal for deciding whether the input signal is standard or nonstandard is implemented in a configuration differing from that of the PLL circuit for generating a sampling clock signal for sampling the nonstandard signal and the horizontal synchronizing signal. Usually, the structure shown in FIG. 1 can assure satisfactory operation in most of practical applications. However, there are some television receivers which may suffer problems mentioned below.

The fly-back transformer 133 receives on the primary side the output pulse signal of the horizontal excitation/horizontal output circuit 132 and produces high voltage on the secondary side. The high voltage is supplied to the picture tube 120 as the anode voltage. Assuming that the picture signal is capable of reconstituting a relatively bright picture, a large beam current flows from the anode to the cathode in the picture tube 120, resulting in that the voltage level of the high voltage is lowered, influence of which makes appearance on the primary side of the fly-back transformer 133. As a consequence, the pulse width and the peak value of the input pulse to the frequency divider 134 (output pulse of the fly-back transformer 133) are changed. In other words, the phase of the output signals of the frequency dividers 134 and 135 will vary depending on the brightness level of the picture signal even when the video signal supplied to the input terminal 101 is the standard signal suffering no deviation in the horizontal frequency and the jitter, whereby the input signal may be decided as the nonstandard signal even when it is a normal standard signal.

However, with the arrangement of the standard/nonstandard signal detecting circuit shown in FIG. 8, discriminative signal detection can be carried out stably independent of the content of the video signal by virtue of the feature that the output signal of the PLL circuit including no fly-back transformer 133 is available. Parenthetically, it should be mentioned that in the standard/nonstandard signal detecting circuit shown in FIG. 8, the oscillation frequency of the voltage controlled oscillator 603 need not be selected at $8f_{SH}$ but may be set at a lower frequency, for example, of $2f_H$. In that case, by dividing the oscillation frequency of $2f_H$ by 525 in the frequency divider 135, a pulse signal of one vertical period can be obtained for the comparison.

Further, according to the embodiment shown in FIG. 1, a comb filter which processes two video signals within one field, i.e. the comb filter for the intra-field processing is used when the nonstandard signal is inputted. In this connection, it should be mentioned that the noise reducer and the scanning line interpolation circuit may be so realized as to perform the spatial signal processing, i.e. the signal processing by making use of the signal between two scanning lines.

Figure 9:
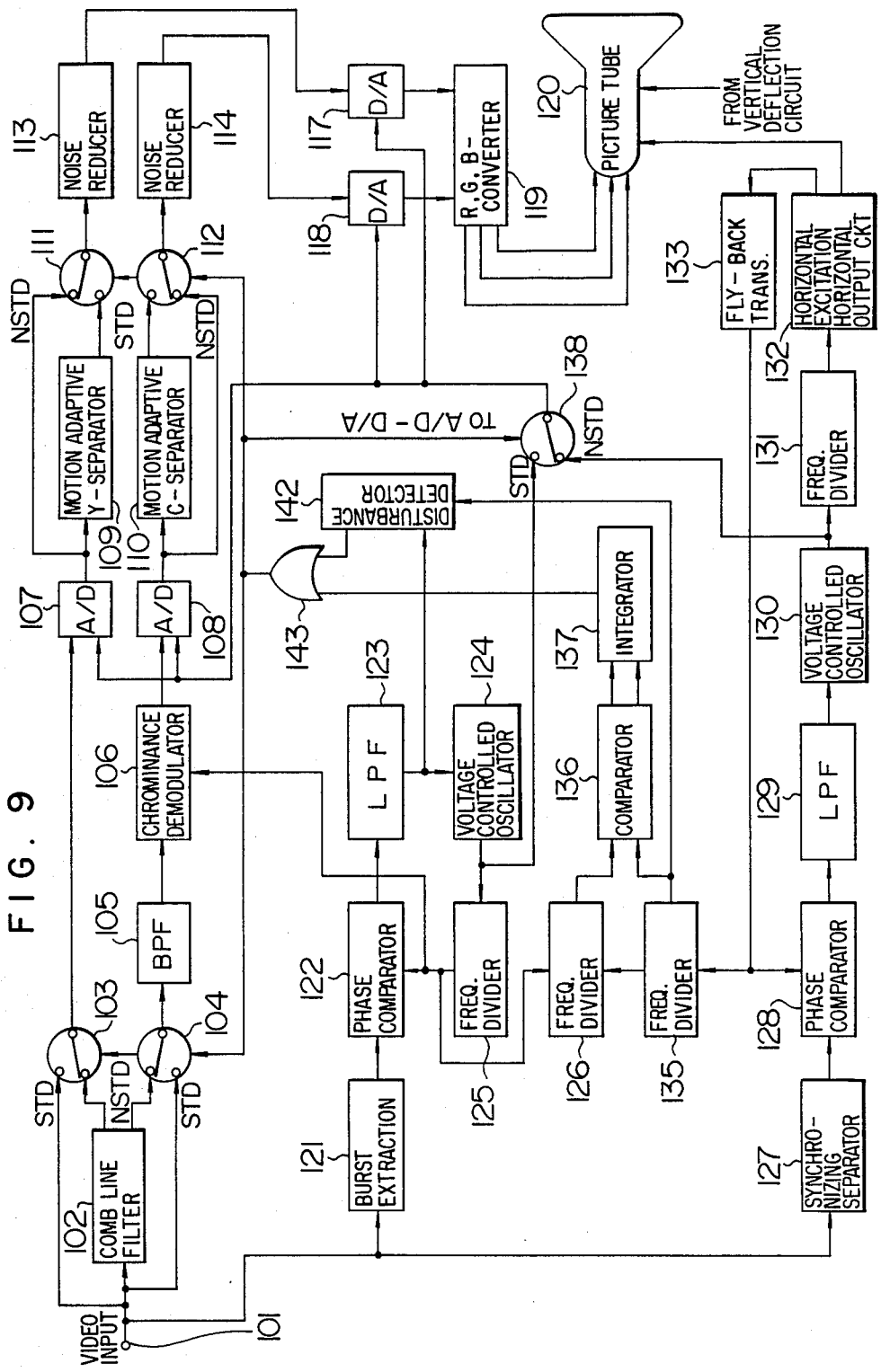
FIG. 9 is a view showing in a block diagram a general arrangement of a signal processing circuit according to a second exemplary embodiment of the present invention.

FIG. 9 shows a circuit for processing the signal for the television receiver together with a synchronization processing circuit according to a second embodiment of the present invention. The circuit arrangement shown in FIG. 9 differs from the one shown in FIG. 1 in that the scanning line interpolation circuit is spared, whereby the horizontal deflection frequency is given by $f_H$. Correspondingly, the frequency divider 134 (⅔ frequency divider) is spared, and the output signal of the fly-back transformer 133 is supplied directly to the phase comparator 128.

The second embodiment of the invention shown in FIG. 9 is also susceptible to the modifications shown in FIGS. 7 and 8, as in the case of the first embodiment shown in FIG. 1.

Figure 10:
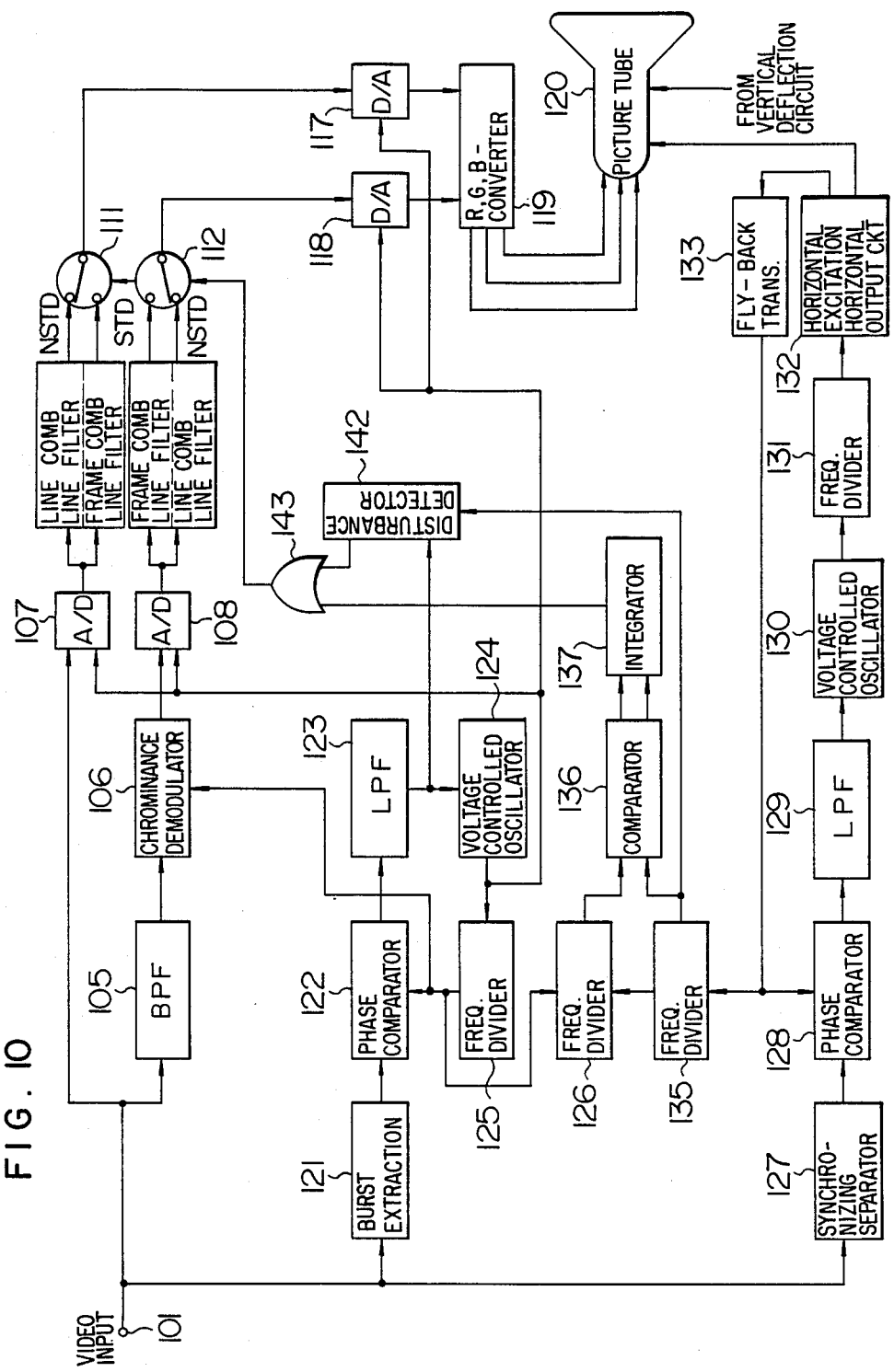
FIG. 10 is a view similar to FIG. 9 and shows a signal processing circuit according to a third embodiment of the invention.

FIG. 10 shows a third embodiment of the circuit for processing the signal for a television receiver together with a synchronization processing circuit according to the present invention. This embodiment differs from the second one shown in FIG. 9 in that neither the noise reducer 113 nor the comb filter 102 are used, and that only the burst-locked clock signal is utilized as the sampling clock signal for the signal processing. In the case of this third embodiment, the motion-adaptive circuits 109 and 110 include the respective comb filters so that they are selected to serve as the motion-adaptive comb filters upon reception of the nonstandard signal.

As will now be appreciated from the foregoing description, according to the teaching of the invention, it is automatically detected whether the input signal is the normal standard signal or nonstandard signal, wherein the signal processing mode and the clock signal are changed over in dependence on the result of the detection. In the horizontal synchronizing circuit, the deflection circuit is driven by utilizing directly the synchronizing signal contained in the input signal as the reference signal. Thus, the deflection circuit can respond rapidly to the input signal even when the latter contains jitter and skew. Further, the signal processing circuit according to te present invention is capable of processing the nonstandard signal by virtue of the use of the scanning line interpolator circuit and the noise reducer. Besides, the synchronizing circuit has rapid tracking (follow-up) capability. Thus, there can be provided a television receiver capable of producing high quality picture.

We claim:

1. A signal processing circuit for use in a television receiver designed to receive a standard television signal which contains a picture signal, a chrominance subcarrier signal and a horizontal synchronizing signal and in which ratio between the frequency of said chrominance subcarrier signal and the frequency of said horizontal synchronizing signal is equal to a predetermined value, or a nonstandard television signal which contains a picture signal, a chrominance subcarrier signal and a horizontal synchronizing signal and in which ratio between the frequency of said chrominance subcarrier signal and the frequency of said horizontal synchronizing signal differs from the corresponding ratio in said standard television signal, and including analogue/digital converter means for converting said television signals into digital signals, motion-adaptive signal processing circuit means for processing said television signals converted to said digital signals, and digital/analogue converter means for converting said television signals processed by said motion-adaptive signal processing circuit means to analogue signals, characterized in that said signal processing circuit comprises:

(a) an input terminal to which said standard television signal or said nonstandard television signal is supplied;

(b) luminance signal/chrominance signal separating circuit connected to said input terminal for receiving said standard television signal or said nonstandard television signal to separate a luminance signal and a chrominance signal from said standard television signal or said nonstandard television signal for thereby producing said luminance signal and two color difference signals, said luminance signal and said color difference signals being supplied to said analogue/digital converter means;

(c) burst signal extracting circuit means connected to said input terminal for receiving said standard television signal to extract a burst signal from said standard television signal or said nonstandard television signal;

(d) horizontal synchronizing signal separator circuit means connected to said input terminal for receiving said standard television signal or said nonstandard television signal to separate a horizontal synchronizing signal from said standard television signal or said nonstandard television signal;

(e) first clock signal generating circuit means connected to said burst signal extracting circuit means and including a first phase-locked loop for generating a first clock signal synchronized with said burst signal;

(f) second clock signal generating circuit means connected to said horizontal synchronizing signal separating circuit and including a second phase-locked loop for generating a second clock signal synchronized with said horizontal synchronizing signal;

(g) signal decision circuit means connected to said first and second clock generating circuit means for comparing phase of said first clock signal with that of said second clock signal to thereby produce a coincidence output signal when frequencies of said first and second clock signals lie within a predetermined range while producing a discrepancy output signal when the frequencies of said first and second clock signals are out of said predetermined range; and (h) switch circuit means connected to said analogue/digital converter means, said digital/analogue converter means, and said first and second clock signal generating circuit means and controlled by said decision circuit means such that upon reception of the coincidence signal from said decision circuit means, said switch circuit means supplies said first clock signal received from said first clock signal generating circuit to said analogue/digital converter means and said digital/analogue converter means while upon reception of said discrepancy signal from said signal decision circuit, said switch circuit means supplies said second clock signal supplied from said second clock signal generating circuit means to said analogue/digital converter circuit means and said digital/analogue converter means.

2. A signal processing circuit for a television receiver according to claim 1, wherein said first phase-locked loop of said first clock signal generating means includes:

(a) a first phase comparison circuit connected to said burst extracting circuit means and supplied with the burst signal from said burst extracting circuit means;

(b) a first low-pass filter connected to said first phase comparison circuitry;

(c) a first voltage controlled oscillator connected to said first low-pass filter and supplied with a control voltage from said first low-pass filter for generating the first clock signal; and (d) a first frequency division circuitry connected between said first voltage controlled oscillator and said first phase comparison circuitry for dividing frequency of the first clock signal generated by said voltage controlled oscillator, wherein the signal resulting from said frequency division is supplied to said first phase comparison circuitry.

3. A signal processing circuit for a television receiver according to claim 2, further including:

(a) a disturbance detecting circuitry connected to said first clock signal generating circuit means for detecting the control voltage supplied to said first voltage controlled oscillator of said first phase-locked loop circuit to produce an output signal when said control voltage exceeds a predetermined threshold value, and (b) a logical sum circuitry connected to said disturbance detecting circuitry and said signal decision circuit means for supplying the output signal of said disturbance detecting circuitry to said switch circuit means as the discrepancy signal.

4. A signal processing circuit for a television receiver according to claim 2, wherein the first voltage controlled oscillator produces the first clock signal having a frequency eight times as high as the frequency of the chrominance subcarrier signal, said first frequency divider dividing the frequency of said first clock signal by a divisor of 8 (multiplication with $\frac{1}{8}$).

5. A signal processing circuit for a television receiver according to claim 1, wherein said signal decision circuit means includes:

(a) a second frequency division circuitry connected to said first clock signal generating circuit means to be supplied therefrom with the first clock signal after having undergone a frequency division for further dividing frequency of said first clock signal undergone said frequency division;

(b) a third frequency division circuitry connected to said second clock generating circuit means to be supplied with the second clock signal after having undergone a frequency division for further dividing frequency of said second clock signal undergone said frequency division;

(c) a first comparator connected to said second and third frequency division circuitries for comparing the frequencies outputted by said second and third frequency division circuitries to produce said coincidence signal or said discrepancy signal; and (d) an integrator connected to said first comparator for integrating said coincidence signal and said discrepancy signal.

6. A signal processing circuit for a television receiver according to claim 5, wherein said integrator includes:

(a) an up-down counter connected to said first comparator to be supplied therefrom with the coincidence signal and the discrepancy signal for counting up and down said coincidence signal sand said discrepancy signal; and (b) a set-reset flip-flop connected to said up-down counter to be set in response to a first output signal of said up-down counter while being reset in response to a second output signal of said up-down counter.

7. A signal processing circuit for a television receiver according to claim 5, wherein said second frequency division circuitry is connected to said third frequency division circuitry such that said second frequency division circuit is reset by the output signal of said third frequency division circuit.

8. A signal processing circuit for a television receiver according to claim 1, wherein the second phase-locked loop circuit of said second clock signal generating circuit means includes:

(a) a second phase comparison circuitry connected to said horizontal synchronizing separator circuit means to be supplied therefrom with a horizontal synchronizing signal;

(b) a second low-pass filter connected to said second phase comparison circuitry;

(c) a second voltage controlled oscillator connected to said second low-pass filter to be supplied therefrom with a control voltage for generating the second clock signal; and (d) a fourth frequency division circuitry connected between said second voltage controlled oscillator and said second phase comparison circuitry for dividing frequency of the second clock signal.

9. A signal processing circuit for use in a television receiver designed to receive a standard television signal which contains a picture signal, a chrominance subcarrier signal and a horizontal synchronizing signal and in which ratio between the frequency of said chrominance subcarrier signal and the frequency of said horizontal synchronizing signal is equal to a predetermined value, or a nonstandard television signal which contains a picture signal, a chrominance subcarrier signal and a horizontal synchronizing signal and in which ratio between the frequency of said chrominance subcarrier signal and the frequency of said horizontal synchronizing signal differs from the corresponding ratio in said standard television signal, and including analogue/digital converter means for converting said television signals into digital signals, motion-adaptive signal processing circuit means for processing said television signals converted to said digital signals, and digital/analogue converter means for converting said television signals processed by said motion-adaptive signal processing circuit means to analogue signals, characterized in that said signal processing circuit comprises:

(a) an input terminal to which said standard television signal or said nonstandard television signal is supplied;

(b) luminance signal/chrominance signal separating circuit connected to said input terminal for receiving said standard television signal or said nonstandard television signal to separate a luminance signal and a chrominance signal from said standard television signal or said nonstandard television signal for thereby producing said luminance signal and two color difference signals;

(c) burst signal extracting circuit means connected to said input terminal for receiving said standard television signal to extract a burst signal from said standard television signal or said nonstandard television signal;

(d) horizontal synchronizing signal separator circuit means connected to said input terminal for receiving said standard television signal or said nonstandard television signal to separate a horizontal synchronizing signal from said standard television signal or said nonstandard television signal;

(e) first clock signal generating circuit means connected to said burst signal extracting circuit means and including a first phase? locked loop for generating a first clock signal synchronized with said burst signal;

(f) second clock signal generating circuit means connected to said horizontal synchronizing signal separating circuit and including a second phase-locked loop for generating a second clock signal synchronized with said horizontal synchronizing signal;

(g) horizontal synchronizing circuit means connected to said horizontal synchronizing signal separating circuit and including a second phase-locked loop for generating a reference signal synchronized with said horizontal synchronizing signal;

(h) signal decision circuit means connected to said first clock generating circuit means for comparing phase of said first clock signal with that of said reference signal to thereby produce a coincidence output signal when the frequency of said first clock signal lies within a predetermined range while producing a discrepancy output signal when the frequency of said first clock signal is outside of said predetermined range; and (i) switch circuit means connected to said analogue/digital converter means, said digital/analogue converter means, and said first and second clock signal generating circuit means and controlled by said decision circuit means such that upon reception of the coincidence signal from said decision circuit means, said switch circuit means supplies said first clock signal received from said first clock signal generating circuit to said analogue/digital converter means and said digital/analogue converter means while upon reception of said discrepancy signal from said signal decision circuit, said switch circuit means supplies said second clock signal supplied from said second clock signal generating circuit means to said analogue/digital converter circuit means and said digital/analogue converter circuit means.

10. A signal processing circuit for a television receiver according to claim 9, wherein said first phase-locked loop of said first clock signal generating means includes:

(a) a phase comparison circuitry connected to said burst extracting circuit means and supplied with the burst signal from said burst extracting circuit means;

(b) a low-pass filter connected to said first phase comparison circuitry;

(c) a voltage controlled oscillator connected to said first low-pass filter and supplied with a control voltage from said first low-pass filter for generating the first clock signal; and (d) a frequency division circuitry connected between said first voltage controlled oscillator and said phase comparison circuitry for dividing the frequency of the first clock signal generated by said voltage controlled oscillator, wherein the signal resulting from said frequency division is supplied to said phase comparison circuitry.

11. A signal processing circuit for a television receiver according to claim 10, further including (a) a disturbance detecting circuitry connected to said first clock signal generating circuit means for detecting the control voltage supplied to said first voltage controlled oscillator of said first phase-locked loop circuit to produce an output signal when said control voltage exceeds a predetermined threshold value, and (b) a logical sum circuitry connected to said disturbance detecting circuitry and said signal decision circuit means for supplying the output signal of said disturbance detecting circuitry to said switch circuit means as the discrepancy signal.

12. A signal processing circuit for a television receiver according to claim 10, wherein said first voltage controlled oscillator produces the first clock signal having a frequency eight times as high as the frequency of the chrominance subcarrier signal, said first frequency divider dividing the frequency of said first clock signal by a divisor of 8 (multiplication with $\frac{1}{8}$).

13. A signal processing circuit for a television receiver according to claim 9, wherein said signal decision circuit means includes:

(a) a second frequency division circuitry connected to said first clock signal generating circuit means to be supplied therefrom with the first clock signal after having undergone a frequency division for further dividing the frequency of said first clock signal having undergone said frequency division;
  (b) a third frequency division circuitry connected to said horizontal synchronizing circuit means to be supplied with the reference signal after having undergone a frequency division for further dividing the frequency of said reference signal having undergone said frequency division;
  (c) a first comparator connected to said second and third frequency division circuitires for comparing the frequencies outputted by said second and third frequency division circuitires to produce said coincidence signal or said discrepancy signal; and
  (d) an integrator connected to said first comparator for integrating said coincidence signal or said discrepancy signal.

14. A signal processing circuit for a television receiver according to claim 13, wherein said integrator includes:
  (a) an up-down counter connected to said comparator to be supplied therefrom with the coincidence signal and the discrepancy signal for counting up and down said coincidence signal and said discrepancy signal; and
  (b) a set-reset flip-flop connected to said up-down counter to be set in response to a first output signal of said up-down counter while being reset in response to a second output signal of said up-down counter.

15. A signal processing circuit for a television receiver according to claim 13, wherein said disturbance detecting circuit includes:
  (a) an amplifier circuitry connected to said first low-pass filter to be supplied with the control voltage produced by said first low-pass filter as the output signal thereof for amplifying said control voltage;
  (b) a second comparator connected to said amplifier circuitry for producing an output signal when said amplified control voltage exceeds a predetermined voltage value; and
  (c) a set-reset flip-flop connected between said second comparator and said third frequency division circuitry so as to be set in response to the output signal of said second comparator while being reset in response to the output signal of said third frequency division circuitry.

16. A signal processing circuit for a television receiver according to claim 13, wherein said second frequency division circuitry is connected to said third frequency division circuitry such that said second frequency division circuit is reset by the output signal of said third frequency division circuit.

* * * * *